US012755730B2

(12) United States Patent
Chun

(10) Patent No.: US 12,755,730 B2
(45) Date of Patent: Oct. 6, 2026

(54) DEVICE AND METHOD FOR EVALUATING SPEECH RECOGNITION SYSTEM

(71) Applicants: Hyundai Motor Company, Seoul (KR); Kia Corporation, Seoul (KR)

(72) Inventor: Chang Woo Chun, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 203 days.

(21) Appl. No.: 18/644,894

(22) Filed: Apr. 24, 2024

(65) Prior Publication Data

US 2025/0104695 A1 Mar. 27, 2025

(30) Foreign Application Priority Data

Sep. 22, 2023 (KR) ........................ 10-2023-0126991

(51) Int. Cl.
*G10L 15/01* (2013.01)

(52) U.S. Cl.
CPC .................................... *G10L 15/01* (2013.01)

(58) Field of Classification Search
CPC ...................................................... G10L 15/01
See application file for complete search history.

(56) References Cited

U.S. PATENT DOCUMENTS

2016/0064008 A1* 3/2016 Graham .................. G10L 15/26 704/227
2022/0399006 A1* 12/2022 Jin ....................... G06N 3/0442
2025/0291554 A1* 9/2025 Schornig ............. G06F 11/3604

FOREIGN PATENT DOCUMENTS

CN 115240632 A * 10/2022 ............. G10L 15/01
KR 20240057946 A * 5/2024 ............ G06F 40/211

OTHER PUBLICATIONS

Liu et al., An adversarial bidirectional serialaparallel LSTM-based QTD framework for product quality prediction, Journal of Intelligent Manufacturing, 2020 (Year: 2020).*
Stolfo et al., Speech recognition in parallel, Speech and Natural Language: Proceedings of a Workshop Held at Cape Cod, Massachusetts, 1989 (Year: 1989).*
Liu et al., An adversarial bidirectional serialÃ¢ÂÂparallel LSTM-based QTD framework for product quality prediction, Journal of Intelligent Manufacturing, 2020 (Year: 2020).*

* cited by examiner

*Primary Examiner* — Bhavesh M Mehta
*Assistant Examiner* — Eunice Lee
(74) *Attorney, Agent, or Firm* — Slater Matsil, LLP

(57) ABSTRACT

An embodiment device for evaluating a speech recognition system including a plurality of speech recognition engines and a plurality of natural language understanding (NLU) engines includes one or more processors and at least one storage device storing a program to be executed by the one or more processors, the program including instructions to obtain speech recognition results in which the plurality of speech recognition engines recognize input audio, evaluate the plurality of speech recognition engines based on a comparison between the speech recognition results, obtain NLU results in which the plurality of NLU engines understand each speech recognition result, and evaluate the plurality of NLU engines based on a comparison between the NLU results.

20 Claims, 8 Drawing Sheets

DEVICE AND METHOD FOR EVALUATING SPEECH RECOGNITION SYSTEM

CROSS-REFERENCE TO RELATED APPLICATIONS

This application claims the benefit of Korean Patent Application No. 10-2023-0126991, filed on Sep. 22, 2023, which application is hereby incorporated herein by reference.

TECHNICAL FIELD

The present disclosure relates to a method and device for evaluating a speech recognition system.

BACKGROUND

The contents described below merely provide background information related to the present disclosure and do not constitute prior art.

As artificial intelligence techniques have recently developed, their applications are also broadening. In particular, conversation systems that enable conversations with users using natural language, such as chatbots or virtual assistants, are being used in various fields, and the technology is gradually developing. In order for a conversation system to conduct a conversation with a user, it is necessary to understand the user's utterance, that is, an input message, from the perspective of the conversation system. In order to achieve this natural language understanding (NLU), the conversation system needs to derive the current context and the user's intent expected in that context from the conversation between the conversation system and the user and analyze the input message based on the derived context and/or intent.

The scope of application of these speech recognition services is expanding from home to various fields such as automobiles. In other words, a speech recognition assistant service and a telematics service are linked, and voice commands generated by a user's voice are transmitted to a car to control the car. Through this, a user can lock/unlock the car's doors, or turn on the air conditioner in advance to control the temperature inside the car.

In this case, data processing based on accurate speech recognition is the most important factor in ensuring user safety.

Even if a speech recognition system can classify the user's speech intent with 95 percent accuracy, since millions of utterances are processed per day in actual speech recognition services, the intent of hundreds of thousands of utterances may be misclassified.

In addition, the accuracy of the speech recognition system may be reduced due to differences between the dataset used to train the speech recognition system and the user data in the speech recognition service stage.

Therefore, there is an urgent need for a method to process more accurate speech recognition in a vehicle and a method to provide more accurate speech recognition results according to user requests.

To achieve this, a speech recognition system is needed that can accurately identify the user's utterance and intent. In order to build such a speech recognition system, it is necessary to evaluate the processing results of the speech recognition system for the user's utterance.

However, there is a lack of research on methods to evaluate the performance of speech recognition systems. In particular, a method of automatically evaluating the processing results of the speech recognition system for a large number of user utterances has not yet been researched.

SUMMARY

At least one embodiment of the present disclosure provides a device for evaluating a speech recognition system including a plurality of speech recognition engines and a plurality of natural language understanding (NLU) engines. The device comprises at least one memory storing computer-executable instructions and at least one processor. The at least one processor is configured to execute the computer-executable instructions to obtain speech recognition results in which the plurality of speech recognition engines recognize input audio, evaluate the plurality of speech recognition engines based on a comparison between the speech recognition results, obtain NLU results in which the plurality of NLU engines understand each speech recognition result, and evaluate the plurality of NLU engines based on a comparison between the NLU results.

Another embodiment of the present disclosure provides a computer implemented method for evaluating a speech recognition system including a plurality of speech recognition engines and a plurality of natural language understanding (NLU) engines. The method comprises obtaining speech recognition results in which the plurality of speech recognition engines recognize input audio, obtaining NLU results in which the plurality of NLU engines understand each speech recognition result, evaluating the plurality of speech recognition engines based on a comparison between the speech recognition results, and evaluating the plurality of NLU engines based on a comparison between the NLU results.

DETAILED DESCRIPTION OF ILLUSTRATIVE EMBODIMENTS

Figure 1:
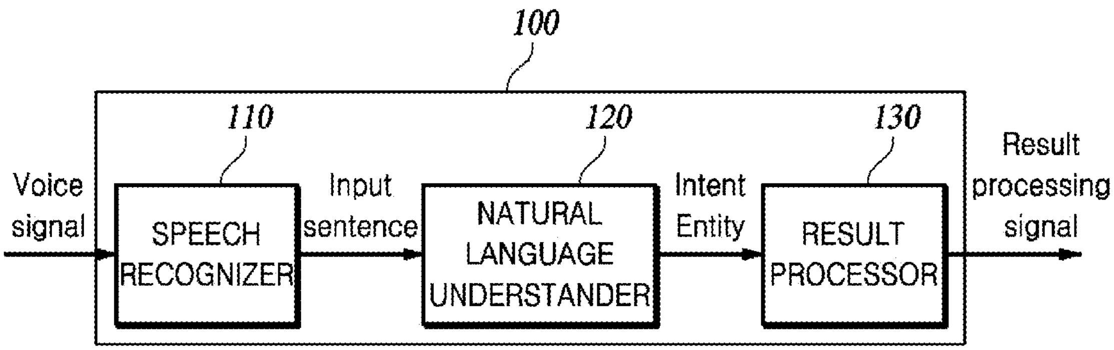
FIG. 1 is a block diagram of a speech recognition system.

An exemplary embodiment of the present disclosure provides a method and device for evaluating and updating a speech recognition system based on the results of processing a large amount of voice data in the speech recognition system.

Embodiments of the present disclosure are described below in detail using various drawings. It should be noted that when reference numerals are assigned to components in each drawing, the same components have the same reference numerals as much as possible, even if they are displayed on different drawings. Furthermore, in the description of embodiments of the present disclosure, where it has been determined that a specific description of a related known configuration or function may obscure the gist of the disclosure, a detailed description thereof has been omitted.

In describing the components of the embodiments according to the present disclosure, symbols such as first, second, i), ii), a), and b) may be used. These symbols are only used to distinguish components from other components. The identity or sequence or order of the components is not limited by the symbols. In the specification, when a part "includes" or is "equipped with" an element, this means that the part may further include other elements, not excluding other elements unless explicitly stated to the contrary. Further, when an element in the written description and claims is described as being "for" performing or carrying out a stated function, step, set of instructions, or the like, the element may also be considered as being "configured to" do so.

Each component of a device or method according to embodiments of the present disclosure may be implemented in hardware or software or in a combination of hardware and software. In addition, the functions of each component may be implemented in software. A microprocessor or processor may execute functions of the software corresponding to each component.

FIG. 1 is a block diagram of a speech recognition system.

Referring to FIG. 1, a speech recognition system 100 recognizes and understands a user's speech and provides services corresponding to the user's speech.

For this purpose, the speech recognition system 100 includes a speech recognizer 110 that converts the user's speech utterance into text, a natural language understander 120 that determines intent and entity included in the user's speech utterance, and a result processor 130 that performs processing to provide results corresponding to the user's intent and entity.

The speech recognizer 110 may convert the user's utterance into an input sentence using at least one speech recognition engine. In this case, the speech recognition engine may refer to a speech to text (STT) engine and may convert a voice signal representing the user's utterance into text by applying a speech recognition algorithm or neural network model to the voice signal.

For example, the speech recognizer 110 may apply a feature vector extraction technique such as Cepstrum, Linear Predictive Coefficient (LPC), Mel Frequency Cepstral Coefficient (MFCC), or Filter Bank Energy to extract a feature vector from the user utterance.

The speech recognizer 110 may obtain a recognition result by comparing the extracted feature vector with a trained reference pattern. For this purpose, an acoustic model that models and compares the signal characteristics of speech or a language model that models the linguistic order relationship of words or syllables corresponding to recognition vocabulary may be used.

The speech recognizer 110 is also capable of converting user utterances into text based on a model that applies machine learning or deep learning.

In embodiments of the present disclosure, a speech recognition result represents text obtained using the speech recognition engine.

The natural language understander 120 determines at least one of the user intent or entity included in the input sentence using at least one natural language understanding (NLU) engine.

The natural language understander 120 may extract information such as domain, entity name, and speech act from the input sentence using the NLU engine and recognize intent and entity according to the intent based on the extraction results. The entity may be referred to as a slot.

The NLU engine may segment the input sentence into morphemes, project the morphemes into a vector space, group the projected vectors to classify the intent according to the input sentence, and extract word components according to the intent in the input sentence as entities.

As an example, when the input sentence is "When do I change the engine oil?", the NLU engine segments the input sentence into "engine", "oil", "when", "change", and "do", and converts each morpheme into a vector. Then, the NLU engine classifies the intent corresponding to the vector based on the similarity between the vectors and their location in the vector space. In the above example, the classified intent is consumable replacement check. The NLU engine extracts the word components "engine" and "oil" as entities based on the intent of the consumable replacement check. A dialogue manager may then provide the sentence "Engine oil change interval is 15,000 Km" based on the consumable replacement check intent and the "engine" and "oil" entities.

As another example, when the input sentence is "Let's go home," the domain is [navigation], the intent is [route setting], and the entities required to perform the control corresponding to the intent are [origin, destination]. As another example, when the input sentence is "Turn on the air conditioner," the domain is [vehicle control], the intent is [air conditioner power on], and the entities required to perform the control corresponding to the intent are [temperature, wind volume].

In embodiments of the present disclosure, the NLU result refers to at least one of an intent or an entity obtained using the NLU engine.

The result processor 130 may output a result processing signal to a vehicle, a user device, or an external server to perform processing to provide a service corresponding to the user's intent.

For example, when the service corresponding to the user's intent is vehicle-related control, the result processor 130 may transmit a result processing signal to perform the vehicle-related control to the vehicle. As another example, when the service corresponding to the user's intent is the provision of specific information, the result processor 130 may search for specific information and provide the searched information to the user terminal. If necessary, information retrieval may be performed on another external server. As another example, when the service corresponding to the user's intent is the provision of specific content, the result processor 130 may request transmission of the target content to an external server that provides the content. In another example, when the service corresponding to the user's intent is simple continuation of a conversation, the result processor 130 may generate a response to the user's utterance and output the response visually or audibly.

The speech recognition system 100 may be provided on the external server or the user terminal, and some of its components may be provided on the external server and other components may be provided on the user terminal. The user terminal may be a mobile device such as a smartphone, a tablet PC, or a wearable device, a home appliance with a user interface, or a vehicle.

The speech recognition system 100 may further include a dialogue manager that manages the overall conversation between the speech recognition system 100 and the user.

The components of the speech recognition system 100 are classified based on their operations or functions, and all or some of them may share memory or a processor.

The speech recognition system 100 may be implemented on either a vehicle or a server. Alternatively, some of the components of the speech recognition system 100 may be included in the vehicle, and others may be included in the server. For example, the vehicle transmits the occupant's voice signal to the server, and the server processes the occupant's voice signal to generate information necessary for the occupant or control commands and transmits the information or control command to the vehicle.

Figure 2:
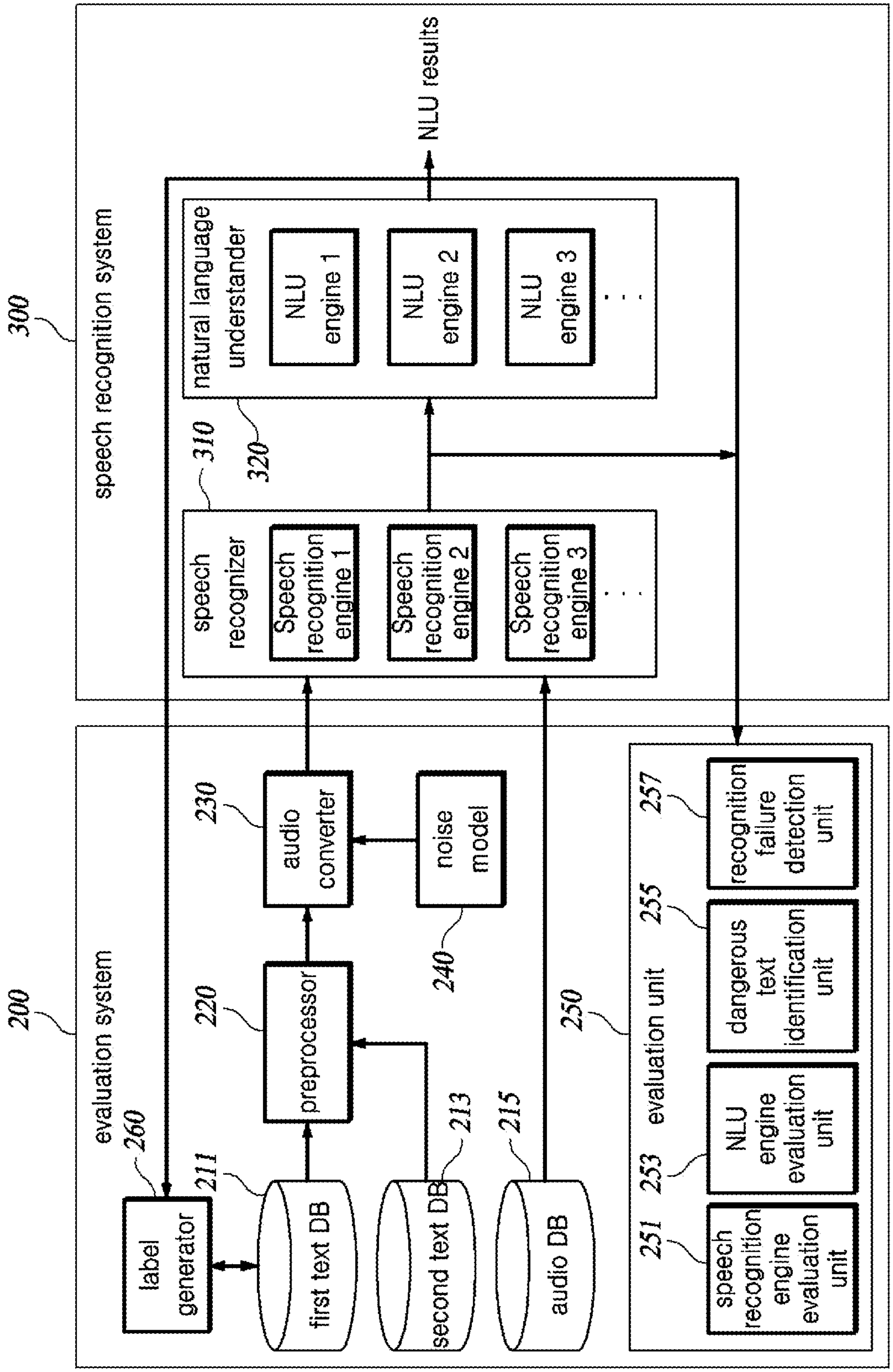
FIG. 2 is a block diagram of an evaluation system and a speech recognition system according to one embodiment of the present disclosure.

FIG. 2 is a block diagram of an evaluation system and a speech recognition system according to one embodiment of the present disclosure.

Referring to FIG. 2, an evaluation system 200 and a speech recognition system 300 are shown.

The speech recognition system 300 is capable of large-scale inference about speech recognition and NLU using parallel speech recognition engines and parallel NLU engines. The speech recognition engines and the NLU engines may be parallelized on a graphics processing unit (GPU). Conventionally, it was possible to test speech recognition on 100 to 30,000 pieces of audio data per day, whereas the speech recognition system 300 and the evaluation system 200 according to embodiments of the present disclosure can test speech recognition on millions of pieces of audio data per day. That is, the speech recognition system 300 can perform speech recognition on large amounts of audio data at high speed. To this end, the speech recognition system 300 includes a speech recognizer 310 and a natural language understander 320.

The speech recognizer 310 includes a plurality of speech recognition engines. The speech recognition engines may generate speech recognition results for input audio using various speech recognition algorithms or neural network models for speech recognition.

The natural language understander 320 includes a plurality of NLU engines. The NLU engines may use various NLU processes or NLU models.

The speech recognizer 310 and the natural language understander 320 may perform the functions of the speech recognizer 110 and the natural language understander 120 in FIG. 1, respectively. Meanwhile, both the speech recognizer 310 and the natural language understander 320 may be provided in the vehicle or the server, or one may be provided in the vehicle and the other may be provided in the server.

Further, the speech recognition system 300 may have its performance evaluated by the evaluation system 200. In particular, a plurality of speech recognition engines in the speech recognizer 310 and a plurality of NLU engines in the natural language understander 320 may process data provided from the evaluation system 200 and be evaluated based on the processing results.

Furthermore, the speech recognition system 300 may be updated using labels generated by a label generator 260 using a super-large artificial intelligence model.

The speech recognition system 300 may include at least one processor and a memory including at least one instruction and may perform the functions of the speech recognizer 310 and the natural language understander 320 through execution of instructions by the at least one processor. The speech recognition system 300 may further include a communication unit for communication with an external device.

The evaluation system 200 is a system for evaluating the performance of the speech recognition system 300. Specifically, the evaluation system 200 provides a large amount of speech data to the speech recognition system 300 and evaluates the performance of the speech recognition system 300 based on the processing results of the speech recognition system 300 for the speech data. The evaluation system 200 may evaluate the speech recognition system 300 in an end-to-end manner.

Since the speech recognition system 300 processes a large amount of speech data generated from logs of customers, the evaluation system 200 can find speech data with many errors based on the processing results of the speech recognition system 300. In other words, the evaluation system 200 can find new needs of customers.

Specifically, the evaluation system 200 includes at least one of a first text DB 211, a second text DB 213, an audio DB 215, a preprocessor 220, an audio converter 230, a noise model 240, an evaluation unit 250, or a label generator 260.

The first text DB 211 and the second text DB 213 store text sentences that are likely to be used by multiple users to utilize the speech recognition system 300. The text sentences may be the result of collecting speech from vehicle occupants.

Unlike the first text DB 211, the second text DB 213 may store tagged or labeled texts. The NLU tag or NLU label of text indicates the NLU target for the text. In other words, the NLU label of the text is the target output that the natural language understander 320 wants to output in response to the text. On the other hand, the first text DB 211 is a user log and stores text sentences without tags or labels.

The audio DB 215 stores audio data that are likely to be used by users to utilize the speech recognition system 300. For example, the audio DB 215 may store audio data representing the results of collecting the user's speech utterance.

To allow the audio converter 230 to naturally convert the text sentences in the first text DB 211 or the second text DB 213 into audio data, the preprocessor 220 may perform question marks, numbers, other language words, special characters, sentence separation, etc.

The audio converter 230 converts text sentences preprocessed by the preprocessor 220 into audio data. The audio converter 230 may convert text sentences into audio data using text-to-speech (TTS) engines. The audio converter 230 may convert a large number of text sentences into audio data using parallelized TTS engines. The TTS engines may be multi-speaker TTS engines. The TTS engines may take into account phonemes according to Korean characteristics, Korean pronunciation, automobile-related terms, algorithms for converting and reading long sentences into short sentences, etc.

In particular, the audio converter 230 converts the preprocessed text sentences into a plurality of voice audios that differ in at least one of a speaking speed, a pitch, or an additional noise. In this case, the additional noise represents vehicle driving noise, tire rubbing noise, wind noise, rain noise, in-vehicle conversation, etc. This additional noise may be generated by the noise model 240.

The audio converter 230 may generate speech utterances that differ in terms of a person's gender, age, region, language, pitch, speech speed, etc. For example, the audio converter 230 may generate audio data that is a synthesis of the voice of a man in his 20s who speaks a specific text sentence at a medium pitch and at a fast speed and the noise of an electric vehicle. As another example, the audio converter 230 may generate audio data that is a synthesis of the voice of a woman in her 60s speaking another text sentence at a low pitch and at a slow speed and rain noise.

Due to the audio converter 230, the evaluation system 200 can evaluate the speech recognition system 300 based on the results of the speech recognition system 300 recognizing various voice data.

The speech recognizer 310 receives audio converted from a text sentence by the audio converter 230 as input audio. The speech recognizer 310 inputs the input audio to each of the plurality of speech recognition engines and obtains speech recognition results in text form from the speech recognition engines. Each speech recognition engine may output one speech recognition result from one input audio.

As an example, the speech recognition engines may use a streaming-based speech recognition model and a language model together. The speech recognition model may be trained on speech recognition based on vehicle-related voice data. The language model is a large language model and may be a generative model. The speech recognition model has high recognition accuracy for vehicle-related speech data, and the language model has relatively high recognition accuracy for general-purpose speech data. Some speech recognition engines use the speech recognition model, and other speech recognition engines use the language model, which allows one audio data to be recognized in various ways.

The natural language understander 320 receives the speech recognition results of the speech recognizer 310, inputs the speech recognition results to each of the plurality of NLU engines, and obtains an NLU result including at least one of an intent or an entity for each speech recognition result from each NLU engine. Each NLU engine may output one NLU result from one speech recognition result.

As an example, the NLU engines may use various NLU models. Bi-LSTM model which has fast training and inference speed and is easy to tune, and ELECTTRA-based model with high intent classification accuracy for dialogical and ambiguous expressions may be used. The NLU engines may be treated like error-tolerant classifiers by using various models in combination.

The evaluation unit 250 evaluates the speech recognition system 300 based on the speech recognition results of the speech recognition engines and the NLU results of the NLU engines. Furthermore, the evaluation unit 250 may specify dangerous text that the speech recognition system 300 does not recognize well.

To this end, the evaluation unit 250 may include at least one of a speech recognition engine evaluation unit 251, an NLU engine evaluation unit 253, a dangerous text identification unit 255, or a recognition failure detection unit 257. In this case, the evaluation unit 250 includes at least one processor and a memory including at least one instruction and may perform the functions of the four evaluation units through execution of instructions by the at least one processor.

The speech recognition engine evaluation unit 251 obtains speech recognition results in which the plurality of speech recognition engines recognize input audio and evaluates the plurality of speech recognition engines based on comparison between the speech recognition results. For example, the speech recognition engine evaluation unit 251 may evaluate a speech recognition engine that outputs a speech recognition result different from most of the speech recognition results as having low performance.

The NLU engine evaluation unit 253 obtains NLU results in which the plurality of NLU engines understand each speech recognition result and evaluates the plurality of NLU engines based on a comparison between the NLU results. The NLU engine evaluation unit 253 may evaluate an NLU engine that outputs an NLU result different from most of the NLU results as having low performance. Furthermore, the NLU engine evaluation unit 253 may evaluate whether the NLU result in which each NLU engine understands the voice-recognized text contains an error using the previously stored label.

The dangerous text identification unit 255 identifies a dangerous text sentence that is difficult to recognize based on a degree of discrepancy between the voice audio recognition results indicating the results of recognizing a plurality of voice audios by at least one speech recognition engine among the plurality of speech recognition engines.

The recognition failure detection unit 257 detects recognition failure for the input audio by comparing the NLU results that at least one NLU engine among the plurality of NLU engines understood the speech recognition results with the NLU label for the speech recognition results. Through this, it is possible to evaluate the speech recognition engine or the NLU engine that caused the recognition failure.

Meanwhile, when there is no NLU label for the speech recognition results, the label generator 260 generates an NLU label for the speech recognition results by applying a language model to the NLU results. Further, the label generator 260 may generate an NLU label for the speech recognition results classified as a domain unrelated to the vehicle. The label generator 260 generates a prompt for the speech recognition result, inputs the prompt as a query into the language model, and modifies the prompt based on the processing results of the language model. Through repetition, the label generator 260 can generate an NLU label, that is, an intent label for the speech recognition result.

In this case, the language model may generate NLU labels based on what parts of the current utterance are omitted, what requirements the current utterance contains, how the current utterance would be classified as intent, and how different the generated label is from the results of the existing NLU.

As an example, the sentence "Raise the sun shade of the back seat" may be misunderstood by NLU engines as "vehicle_wind_direction_topfloor_back" and "vehicle_window_close_back". When these sentences are applied to the language model, the language model can understand the errors in the NLU results. First, the language model understands that the input sentence means a command to raise the sun shade of the rear seat of the car, understands that the sun shade represents a sunshade function, and understands that raising the sun shade is different from closing the window. In other words, the language model understands the utterance sentences. It can then self-feedback that the sentence "vehicle_wind_direction_topfloor_back" and the sentence "vehicle_window_close_back" are misclassified intents. The language model understands that "vehicle_wind_direction_topfloor_back" means to change the wind direction, and therefore does not fit the intent of the utterance sentence. The language model understands that "vehicle_window_close_back" means to close the rear window of the car, and therefore does not fit the intent of the utterance sentence. The language model may output "vehicle_sunshade_up_back" based on the NLU results of the NLU engines and its own feedback results. The label generator 260 may generate a label for an unlabeled speech recognition result using a language model.

The language model is a large language model and may be a generative model. The language model is an autoregressive model and may refer to a language model that allows inference without fine-tuning using methods such as few-shot learning and has more than 10 times as many parameters (e.g., more than 100 billion parameters) as existing general language models. For example, large-scale language models such as the Generative Pre-trained Transformer 4 (GPT-4) model are excellent few-shot learners that can be controlled through natural prompts, allowing for in-context learning with the ability to understand patterns with only a small amount of data through prompts to solve NLP problems.

Figure 3:
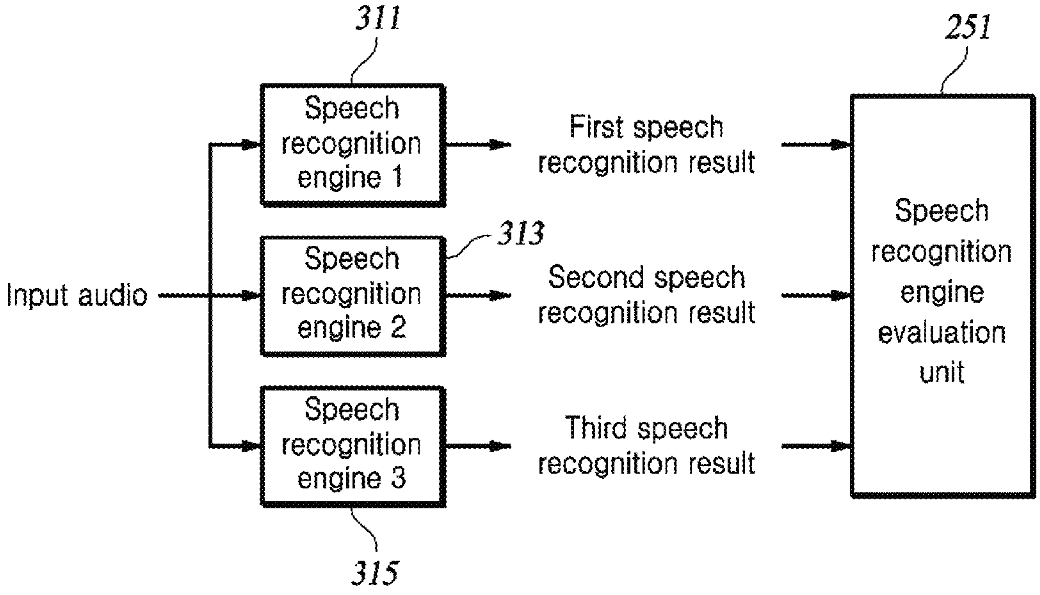
FIG. 3 is a diagram for explaining the evaluation of a speech recognition engine according to one embodiment of the present disclosure.

FIG. 3 is a diagram for explaining the evaluation of the speech recognition engine according to one embodiment of the present disclosure.

Referring to FIG. 3, speech recognition engines 311, 313, and 315 each recognize input audio and output speech recognition results in the form of text.

The speech recognition engine evaluation unit 251 obtains speech recognition results in which the plurality of speech recognition engines 311, 313, and 315 recognize the input audio.

The speech recognition engine evaluation unit 251 may evaluate the plurality of speech recognition engines 311, 313, and 315 based on a comparison between the speech recognition results. Specifically, the speech recognition engine evaluation unit 251 may evaluate the speech recognition engine that outputs a specific speech recognition result based on the number of speech recognition results that are identical or similar to the specific speech recognition result.

For example, a first speech recognition result may be the same as a second speech recognition result, while a third speech recognition result may be different from the first speech recognition result and the second speech recognition result. In this case, the speech recognition engine evaluation unit 251 may evaluate the first speech recognition engine 311 and the second speech recognition engine 313 as having high performance and may evaluate the third speech recognition engine 315 as having low performance.

When the speech recognition results of the speech recognition engines 311, 313, and 315 are different, the speech recognition engine evaluation unit 251 may evaluate the performance of all of the speech recognition engines 311, 313, and 315 as low. In this case, the dangerous text identification unit 255 may identify the text before conversion of the corresponding input audio as dangerous text.

Furthermore, the speech recognition engine evaluation unit 251 may evaluate the speech recognition engines 311, 313, and 315 in detail with reference to at least one of the speaking speed, the pitch, or the additional noise used to generate the input audio. For example, the speech recognition engine evaluation unit 251 may evaluate the performance of the speech recognition engines 311, 313, and 315 in recognizing male speech utterances and the performance of the speech recognition engines 311, 313, and 315 in recognizing female speech utterances. Through this, the speech recognition engine evaluation unit 251 can distinguish, among the speech recognition engines 311, 313, and 315, a speech recognition engine that recognizes male speech utterances well and a speech recognition engine that recognizes female speech utterances well.

Figure 4:
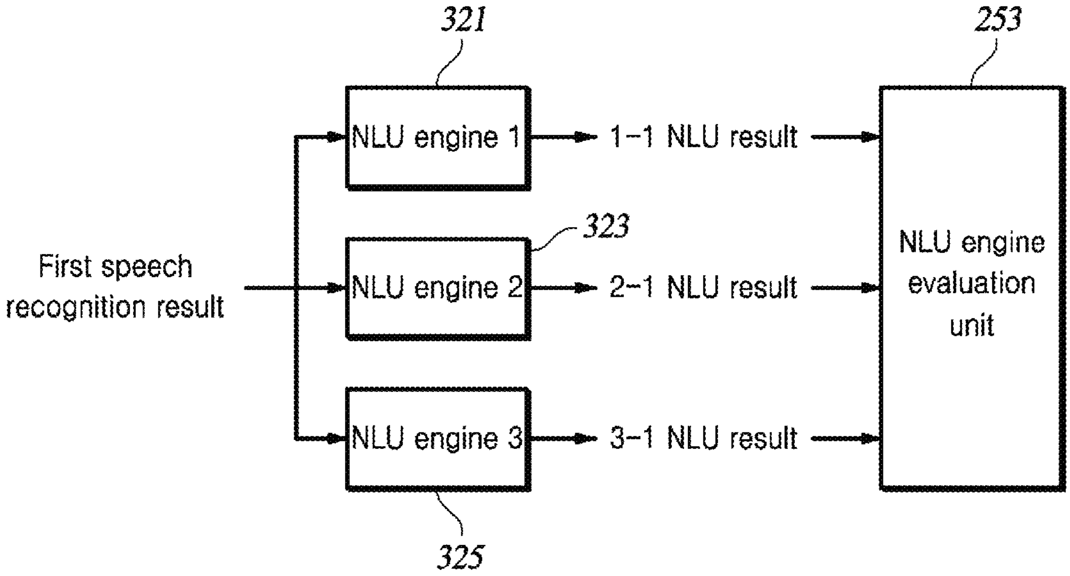
FIG. 4 is a diagram for explaining the evaluation of an NLU engine according to one embodiment of the present disclosure.

FIG. 4 is a diagram for explaining the evaluation of the NLU engine according to one embodiment of the present disclosure.

Referring to FIG. 4, NLU engines 321, 323, and 325 understand speech recognition results of speech recognition engines and output NLU results including at least one of an intent or an entity. In FIG. 4, an operation of evaluating the performance of the NLU engines 321, 323, and 325 using the first speech recognition result among the speech recognition results of FIG. 3 is explained.

The NLU engine evaluation unit 253 obtains NLU results in which the plurality of NLU engines understand the first speech recognition result. The NLU results include a 1-1 NLU result, a 2-1 NLU result, and a 3-1 NLU result output from the first speech recognition result by the NLU engines 321, 323, and 325, respectively.

The NLU engine evaluation unit 253 evaluates the plurality of NLU engines based on a comparison between the NLU results. The NLU engine evaluation unit 253 may evaluate the NLU engine that outputs a specific NLU result based on the number of NLU results that are identical or similar to the specific NLU result.

For example, while the 1-1 NLU result and the 2-1 NLU result are the same, the 3-1 NLU result may be different from the 1-1 NLU result and the 2-1 NLU result. In this case, the NLU engine evaluation unit 253 may evaluate the performance of the first NLU engine 321 and the second NLU engine 323 as high and evaluate the performance of the third NLU engine 325 as low.

Figure 5:
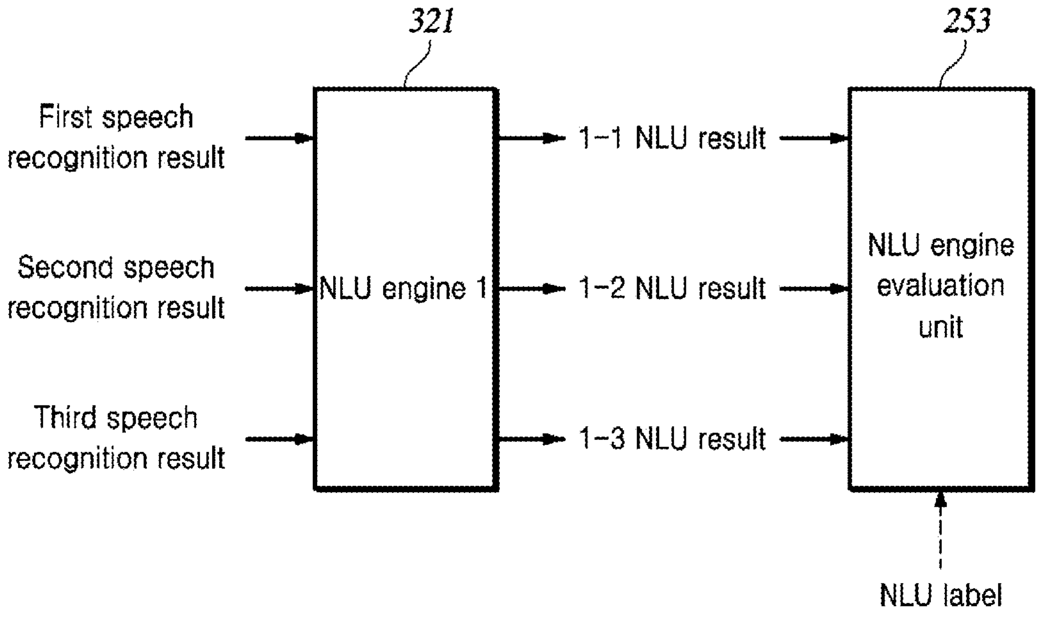
FIG. 5 is a diagram for explaining the evaluation of an NLU engine according to another embodiment of the present disclosure.

FIG. 5 is a diagram for explaining the evaluation of the NLU engine according to another embodiment of the present disclosure.

Referring to FIG. 5, first, for evaluation of the first NLU engine 321, NLU labels for speech recognition results are required. In this case, the NLU label is the same as the NLU label of the text corresponding to the speech recognition results. Specifically, the NLU labels for the first speech recognition result, the second speech recognition result, and the third speech recognition result are the same as the NLU label of the text used to generate the input audio in FIG. 1.

The first NLU engine 321 understands each of the first, second, and third speech recognition results in FIG. 1 and outputs the 1-1 NLU result, the 1-2 NLU result, and the 1-3 NLU result.

FIG. 5 illustrates, among the NLU engines 321, 323, and 325 of FIG. 4, the operation of evaluating the performance of the first NLU engine 321 based on the NLU results of the first NLU engine 321 recognizing the speech recognition results of FIG. 2.

The NLU engine evaluation unit 253 may evaluate the first NLU engine 321 by comparing the NLU results of the first NLU engine 321 with NLU labels for speech recognition results.

When the 1-1 NLU result is the same as the NLU label, the NLU engine evaluation unit 253 may evaluate the performance of the first NLU engine 321 as high. Conversely, when the similarity between the 1-2 NLU result and the NLU label is low, the NLU engine evaluation unit 253 may evaluate the performance of the first NLU engine 321 as low.

In this way, the NLU engine evaluation unit 253 evaluates the performance of the first NLU engine 321 based on the extent to which the 1-1 NLU result, the 1-2 NLU result, and the 1-3 NLU result are identical or similar to the NLU label.

Figure 6:
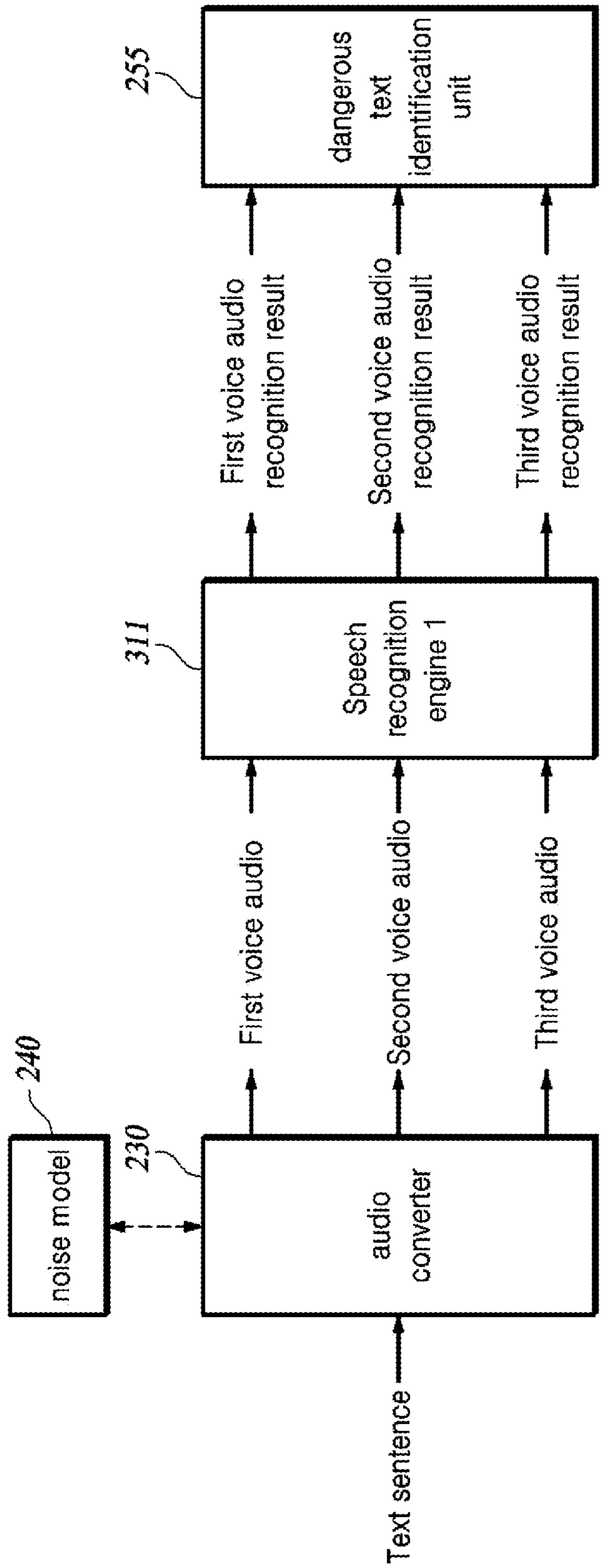
FIG. 6 is a diagram for explaining dangerous text identification according to one embodiment of the present disclosure.

FIG. 6 is a diagram for explaining dangerous text identification according to one embodiment of the present disclosure.

Referring to FIG. 6, the audio converter 230 obtains additional noise using the noise model 240 and converts an input text sentence into a plurality of voice audios that differ in at least one of a speaking speed, a pitch, or an additional noise.

The first speech recognition engine 311 recognizes each of a first voice audio, a second voice audio, and a third voice audio and outputs the first voice audio recognition result, the second voice audio recognition result, and the third voice audio recognition result.

In this case, since the first voice audio, the second voice audio, and the third voice audio have different acoustic characteristics, the first voice audio recognition result, the second voice audio recognition result, and the third voice audio recognition results may be different.

The dangerous text identification unit 255 obtains voice audio recognition results in which the first speech recognition engine 311 recognizes the plurality of voice audios and identifies the text sentence as a dangerous text based on the degree of discrepancy between the voice audio recognition results.

As an example, when the first voice audio recognition result and the second voice audio recognition result are the same, but the third voice audio recognition result is different from the first voice audio recognition result and the second voice audio recognition result, the dangerous text identification unit 255 may identify the text sentence input to the audio converter 230 as a dangerous text.

As another example, when the first voice audio recognition result, the second voice audio recognition result, and the third voice audio recognition result are different, the dangerous text identification unit 255 may identify the text sentence as a dangerous text.

In this way, the dangerous text identification unit 255 can identify a dangerous text that has a high probability of being misrecognized by the first speech recognition engine 311. The dangerous text may be used to update the speech recognition engines later.

Figure 7:
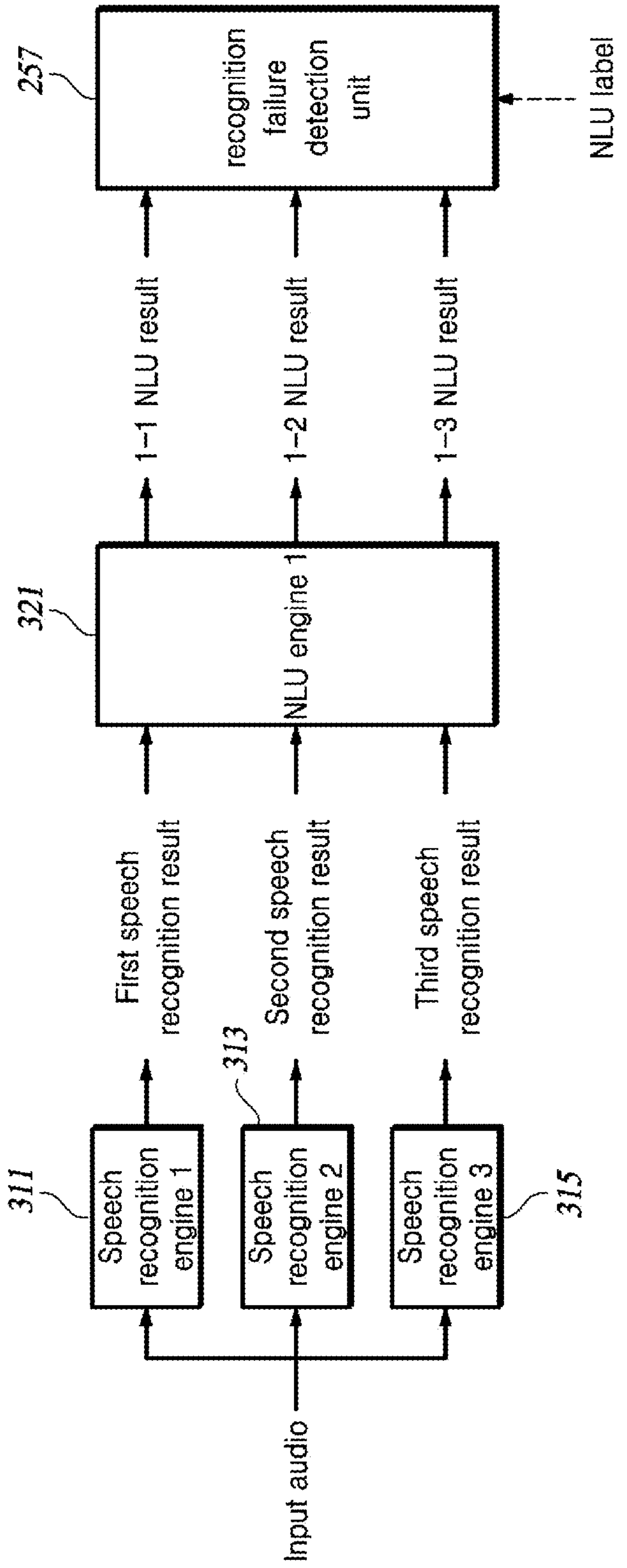
FIG. 7 is a diagram for explaining recognition failure detection according to one embodiment of the present disclosure.

FIG. 7 is a diagram for explaining recognition failure detection according to one embodiment of the present disclosure.

Referring to FIG. 7, the operation of detecting recognition failure based on NLU results in which the first NLU engine 321 among the NLU engines 321, 323, and 325 of FIG. 4 recognizes the speech recognition results is described.

First, the speech recognition engines 311, 313, and 315 recognize input audio and output a first speech recognition result, a second speech recognition result, and a third speech recognition result.

The first NLU engine 321 outputs NLU results that are results of understanding the speech recognition results.

The recognition failure detection unit 257 detects recognition failure for the input audio by comparing the NLU results of the first NLU engine 321 understanding the speech recognition results with the NLU labels for the speech recognition results.

When any of the 1-1 NLU result, the 1-2 NLU result, or the 1-3 NLU result is different from the NLU label for the speech recognition results, the recognition failure detection unit 257 determines that the speech recognition system failed to recognize the input audio.

Furthermore, when the first speech recognition result, the second speech recognition result, and the third speech recognition result are the same, the NLU engine evaluation unit may determine that the recognition failure of the input audio was caused by the first NLU engine 321. The NLU engine evaluation unit may evaluate the performance of the first NLU engine 321 as low.

In this way, by checking whether the input audio, which is the input of the speech recognition system, and the NLU results, which are the output of the speech recognition system, correspond, the performance of the successful speech recognition from a customer service perspective can be evaluated.

Meanwhile, when the 1-1 NLU result, the 1-2 NLU result, and the 1-3 NLU result are the same as the NLU label for the speech recognition results, the recognition failure detection unit 257 determines that the speech recognition system was successful in recognizing the input audio.

However, even in the case of successful recognition, when some of the first speech recognition result, the second speech recognition result, and the third speech recognition result are different, the recognition failure detection unit 257 determines that the NLU results contain a defect. In other words, although the speech recognition is successful from a customer service perspective, defects that occurred in the process of deriving the NLU results from the input audio may be detected.

When some of the first speech recognition result, the second speech recognition result, and the third speech recognition result are different, the speech recognition engine evaluation unit 251 may determine that the defect in the NLU results is caused by at least one of the plurality of speech recognition engines 311, 313, and 315. In particular, when the first speech recognition result and the second speech recognition result are the same, and the third speech recognition result is different from the first speech recognition result and the second speech recognition result, the speech recognition engine evaluation unit 251 may determine that the defect in the NLU results is caused by the third speech recognition engine 315. The speech recognition engine evaluation unit 251 may evaluate the performance of the speech recognition engine that caused the defect as low. Furthermore, the dangerous text identification unit 255 may identify the input audio that caused the speech recognition defect as dangerous audio.

Figure 8:
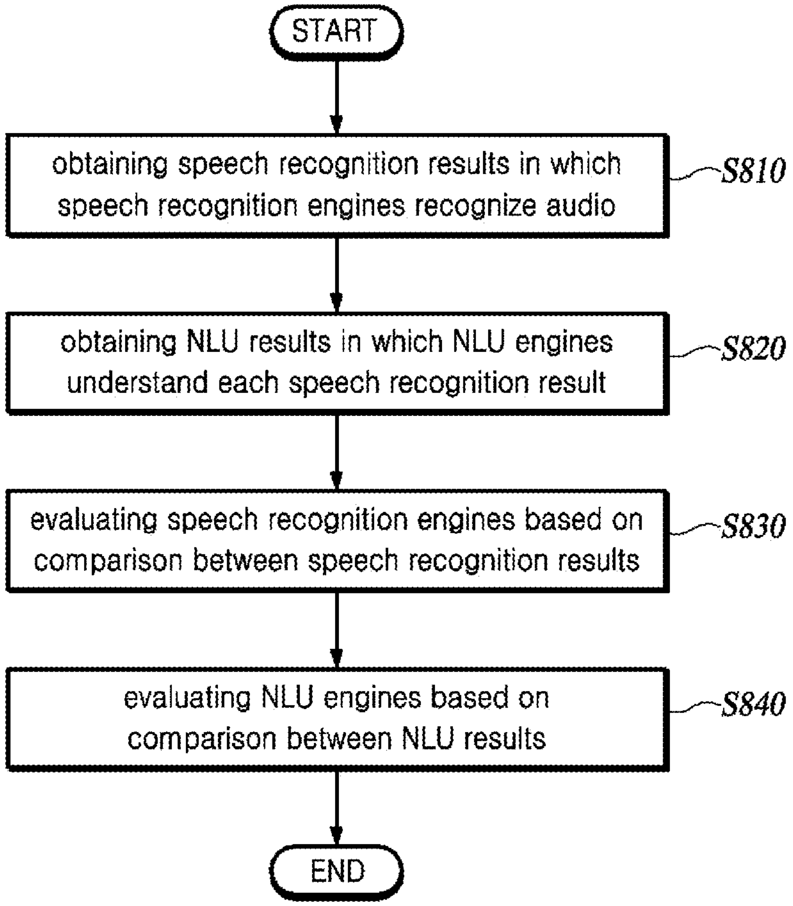
FIG. 8 is a flowchart of an evaluation method according to one embodiment of the present disclosure.

FIG. 8 is a flowchart of an evaluation method according to one embodiment of the present disclosure.

Referring to FIG. 8, an evaluation device for evaluating a speech recognition system obtains speech recognition results in which a plurality of speech recognition engines recognize audio (S810).

The evaluation device obtains NLU results in which a plurality of NLU engines understand each of the speech recognition results (S820).

The evaluation device evaluates the plurality of speech recognition engines based on a comparison between the speech recognition results (S830).

The evaluation device evaluates the plurality of NLU engines based on a comparison between the NLU results (S840).

Furthermore, the evaluation device may further evaluate each NLU engine by comparing each NLU result with an NLU label for the speech recognition results.

Meanwhile, the evaluation device may convert the prestored text sentence into a plurality of voice audios that differ in at least one of a speaking speed, a pitch, or an additional noise, and it may identify the text sentence as dangerous text based on the degree of discrepancy between voice audio recognition results in which at least one speech recognition engine recognizes the plurality of voice audios.

In addition, the evaluation device may detect recognition failure for the input audio by comparing the NLU results of at least one NLU engine understanding the speech recognition results with the NLU label for the speech recognition results. When the speech recognition results are the same, the evaluation device may determine that the recognition failure was caused by the NLU engine.

Even if the NLU results of the NLU engine are the same as the NLU label for the speech recognition results, when at least two of the speech recognition results are different, the evaluation device may determine that the NLU results of one NLU engine contain a defect. The evaluation device may determine that the defect in the NLU results of the NLU engine was caused by the speech recognition engine.

Meanwhile, when there is no NLU label for the speech recognition results, the evaluation device may generate an NLU label for the speech recognition results by applying a language model to the NLU results. The generated NLU label may be used to evaluate the NLU engine or to detect recognition failures in the speech recognition system.

As described above, according to one embodiment of the present disclosure, it is possible to evaluate and update the speech recognition system based on the results of processing large amounts of voice data in the speech recognition system.

Various techniques described herein may be implemented in digital electronic circuitry, or in computer hardware, firmware, software, or combinations thereof. Implementations may be in the form of a computer program tangibly embodied in a computer program product, i.e., an information carrier, e.g., a machine-readable storage device (computer-readable medium) or a propagated signal, for processing by, or controlling, the operation of a data processing device, e.g., a programmable processor, a computer, or a number of computers. A computer program, such as the above-mentioned computer program(s), may be written in any form of programming language, including compiled or interpreted languages and may be deployed in any form, including as a stand-alone program or as a module, component, subroutine, or other unit suitable for use in a computing environment. The computer program may be deployed to run on a single computer or multiple computers at one site or distributed across multiple sites and interconnected by a communications network.

In addition, components of embodiments of the present disclosure may use an integrated circuit structure such as a memory, a processor, a logic circuit, a look-up table, and the like. These integrated circuit structures execute each of the functions described herein through the control of one or more microprocessors or other control devices. In addition, components of embodiments of the present disclosure may be specifically implemented by a program or a portion of a code that includes one or more executable instructions for performing a specific logical function and is executed by one or more microprocessors or other control devices. In addition, components of embodiments of the present disclosure may include or be implemented as a central processing unit (CPU), a microprocessor, etc. that perform respective functions. In addition, components of embodiments of the present disclosure may store instructions executed by one or more processors in one or more memories.

Processors suitable for processing computer programs include, by way of example, both general purpose and special purpose microprocessors, as well as one or more processors of any kind of digital computer. Generally, a processor will receive instructions and data from a read-only memory or a random access memory or both. The essential elements of a computer may include at least one processor that executes instructions and one or more memory devices that store instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include, by way of example, semiconductor memory devices, e.g., magnetic media such as hard disks, floppy disks, and magnetic tapes, optical media such as compact disk read only memories (CD-ROMs) and digital video disks (DVDs), magneto-optical media such as floptical disks, read only memories (ROMs), random access memories (RAMs), flash memories, erasable programmable ROMs (EPROMs), electrically erasable programmable ROMs (EEPROMs), etc. The processor and the memory may be supplemented by, or incorporated in, special purpose logic circuitry.

The processor may execute an operating system and software applications executed on the operating system. Moreover, a processor device may access, store, manipulate, process, and generate data in response to software execution. For the sake of convenience, there is a case where a single processor device is used, but those skilled in the art will understand that the processor device can include multiple processing elements and/or multiple types of processing elements. For example, the processor device may include a plurality of processors or a single processor and a single controller. Other processing configurations, such as parallel processors, are also possible.

In addition, non-transitory computer-readable media may be any available media that can be accessed by a computer and may include both computer storage media and transmission media.

This specification includes details of various specific implementations, but they should not be understood as limiting the scope of any invention or what is claimed, and they should be understood as descriptions of features that may be unique to particular embodiments of a particular invention. In the context of individual embodiments, specific features described herein may also be implemented in combination with a single embodiment. On the contrary, various features described in the context of a single embodiment can also be implemented in multiple embodiments independently or in any appropriate sub-combination. Further, although the features may operate in a particular combination and may be initially described as so claimed, one or more features from the claimed combination may be in some cases excluded from the combination, and the claimed combination may be modified into a sub-combination or a variation of the sub-combination.

Likewise, although the operations are depicted in the drawings in a particular order, it should not be understood that such operations must be performed in that particular order or the sequential order shown to achieve the desirable result or that all the depicted operations should be performed. In certain cases, multitasking and parallel processing may be advantageous. Moreover, the separation of various device components of the above-described embodiments should not be understood as requiring such separation in all embodiments, and it should be understood that the described program components and devices can generally be integrated together in a single software product or packaged into multiple software products.

The foregoing description is merely illustrative of the technical concept of the present embodiments. Various modifications and changes may be made by those of ordinary skill in the art without departing from the essential characteristics of each embodiment. Therefore, the present embodiments are not intended to limit but to describe the technical idea of the present embodiments. The scope of the technical concept of the embodiments is not limited by these embodiments. The scope of protection of the various embodiments should be construed by the following claims. All technical ideas that fall within the scope of equivalents thereof should be interpreted as being included in the scope of the present embodiments.

What is claimed is:

1. A device for evaluating a speech recognition system including a plurality of speech recognition engines and a plurality of natural language understanding (NLU) engines, the device comprising:

one or more processors; and at least one storage device storing a program to be executed by the one or more processors, the program including instructions to:

obtain speech recognition results in which the plurality of speech recognition engines recognize input audio;

evaluate the plurality of speech recognition engines based on a comparison between the speech recognition results;

obtain NLU results in which the plurality of NLU engines understand each speech recognition result;

evaluate the plurality of NLU engines based on a comparison between the NLU results;

detect recognition failure of the input audio by comparing NLU results of one NLU engine understanding the speech recognition results with an NLU label for the speech recognition results; and in response to a determination indicating that the NLU results of the one NLU engine are the same as the NLU label for the speech recognition results, but at least two of the speech recognition results are different, determine that the NLU results of the one NLU engine contain a defect.

2. The device of claim 1, wherein the program further includes instructions to:

convert a pre-stored text sentence into a plurality of voice audios that differ in at least one of a speaking speed, a pitch, or an additional noise; and identify the text sentence as a dangerous text based on a degree of discrepancy between voice audio recognition results in which one of the plurality of speech recognition engines recognizes the plurality of voice audios.

3. The device of claim 1, wherein the program further includes instructions to evaluate each NLU engine by comparing each NLU result with an NLU label for the speech recognition results.

4. The device of claim 1, wherein the program further includes instructions to determine that the detected recognition failure was caused by the one NLU engine in a case in which the speech recognition results are the same.

5. The device of claim 1, wherein the program further includes instructions to determine that the defect in the NLU results of the one NLU engine is caused by at least one of the plurality of speech recognition engines.

6. The device of claim 1, wherein the program further includes instructions to generate an NLU label for the speech recognition results by applying a language model to the NLU results.

7. A computer implemented method for evaluating a speech recognition system including a plurality of speech recognition engines and a plurality of natural language understanding (NLU) engines, the method comprising:

obtaining speech recognition results in which the plurality of speech recognition engines recognize input audio;

obtaining NLU results in which the plurality of NLU engines understand each speech recognition result;

evaluating the plurality of speech recognition engines based on a comparison between the speech recognition results;

evaluating the plurality of NLU engines based on a comparison between the NLU results;

detecting recognition failure of the input audio by comparing NLU results of one NLU engine understanding the speech recognition results with an NLU label for the speech recognition results; and determining that the NLU results of the one NLU engine contain a defect in a case in which the NLU results of the one NLU engine are the same as the NLU label for the speech recognition results, but at least two of the speech recognition results are different.

8. The method of claim 7, further comprising:

converting a pre-stored text sentence into a plurality of voice audios that differ in at least one of a speaking speed, a pitch, or an additional noise; and identifying the text sentence as a dangerous text based on a degree of discrepancy between voice audio recognition results in which one of the plurality of speech recognition engines recognizes the plurality of voice audios.

9. The method of claim 7, further comprising evaluating each NLU engine by comparing each NLU result with an NLU label for the speech recognition results.

10. The method of claim 7, further comprising determining that the detected recognition failure was caused by the one NLU engine in a case in which the speech recognition results are the same.

11. The method of claim 7, further comprising determining that the defect in the NLU results of the one NLU engine is caused by at least one of the plurality of speech recognition engines.

12. The method of claim 7, further comprising generating an NLU label for the speech recognition results by applying a language model to the NLU results.

13. The method of claim 7, wherein evaluating the plurality of speech recognition engines comprises evaluating performance of each speech recognition engine with reference to at least one of a speaking speed, a pitch, or an additional noise used to generate the input audio.

14. The device of claim 1, wherein evaluating the plurality of speech recognition engines comprises evaluating performance of each speech recognition engine with reference to at least one of a speaking speed, a pitch, or an additional noise used to generate the input audio.

15. A non-transitory computer-readable storage medium storing instructions that, when executed by one or more computers, cause the one or more computers to perform operations, the operations comprising:

recognizing input audio;

obtaining speech recognition results generated by each of a plurality of speech recognition engines based on the recognized input audio;

obtaining natural language understanding (NLU) results generated by each of a plurality of NLU engines based on the obtained speech recognition results;

evaluating the plurality of speech recognition engines based on a comparison between the speech recognition results;

evaluating the plurality of NLU engines based on a comparison between the NLU results;

detecting recognition failure of the input audio by comparing (i) particular NLU results of a particular NLU engine, of the plurality of NLU engines, and (ii) an NLU label for the speech recognition results;

determining that the particular NLU results of the particular NLU engine (i) are the same as the NLU label for the speech recognition results and (ii) that at least two of the speech recognition results are different; and in response to the determination that the NLU results of the particular NLU engine (i) are the same as the NLU label for the speech recognition results and (ii) that at least two of the speech recognition results are different, determining that the NLU results of the particular NLU engine contain a defect.

16. The non-transitory computer-readable storage medium of claim 15, wherein evaluating the plurality of speech recognition engines comprises:

evaluating performance of each speech recognition engine with reference to at least one of a speaking speed, a pitch, or an additional noise used to generate the input audio.

17. The non-transitory computer-readable storage medium of claim 15, the operations further comprising:

converting a pre-stored text sentence into a plurality of voice audios differing in at least one of a speaking speed, a pitch, or an additional noise; and identifying the text sentence as a dangerous text based on a degree of discrepancy between voice audio recognition results.

18. The non-transitory computer-readable storage medium of claim 15, the operations further comprising:

evaluating each NLU engine by comparing each NLU result with an NLU label for the speech recognition results.

19. The non-transitory computer-readable storage medium of claim 15, the operations further comprising:

determining that the detected recognition failure was caused by the particular NLU engine in a case in which the speech recognition results are the same.

20. The non-transitory computer-readable storage medium of claim 15, the operations further comprising:

generating an NLU label for the speech recognition results by applying a language model to the NLU results.

* * * * *